United States Patent [19]

Isaev

[11] 3,983,748
[45] Oct. 5, 1976

[54] PICKUP FOR MEASURING THE MAXIMUM PRESSURE IN INTERNAL COMBUSTION ENGINE CYLINDER

[76] Inventor: Afanasy Alexandrovich Isaev, ulitsa Volodarskogo, 12, kv. 1, Kolpino, Leningrad, U.S.S.R.

[22] Filed: July 24, 1975

[21] Appl. No.: 598,984

[52] U.S. Cl. ................................. 73/115; 73/396
[51] Int. Cl.² ................... G01M 15/00; G01L 7/16
[58] Field of Search .................. 73/115, 116, 119 R, 73/396

[56] References Cited
UNITED STATES PATENTS

| | | | |
|---|---|---|---|
| 2,084,356 | 6/1937 | Prescott | 73/115 X |
| 3,633,410 | 1/1972 | Isaev | 73/115 |

Primary Examiner—Richard C. Queisser
Assistant Examiner—John S. Appleman
Attorney, Agent, or Firm—Haseltine, Lake & Waters

[57] ABSTRACT

According to the invention a pickup for measuring the maximum pressure in the internal combustion engine cylinder comprises a spring-loaded reversing valve mounted in a housing and being in contact with the first seat made in the housing on the side of the compressed air supply passage. In another operating position the reversing valve contacts the second seat which is an end face of the bead made on the rod of another valve. The meter chamber confined with the operating surface of the reversing valve and the second seat is communicated with the engine cylinder through a passage made in said rod. The pressure to be measured in the engine cylinder corresponds to the counter-pressure of the compressed air. The pickup according to the invention is compact in structure and convenient in operation.

1 Claim, 2 Drawing Figures

PICKUP FOR MEASURING THE MAXIMUM PRESSURE IN INTERNAL COMBUSTION ENGINE CYLINDER

The present invention relates to devices for measuring the quick variable pressure in cylinders of the piston machines and more particularly to pickups for measuring the maximum pressure in the cylinders of the internal combustion engines when adjusting them and checking the uniform load distribution in the cylinders thereof. The pressure pickups are used under industrial conditions for monitoring the maximum pressure in the cylinders of the manufactured engines as well as in operation thereof for checking periodically the maximum pressure and adjusting the engines.

Known in the art are plug-in maximum meter for measuring the maximum pressure in heavy low-speed engines, connected to the indicating valve of the engine cylinder for monitoring only. The process of the pressure measurement successively in all the cylinders by a maximum meter takes much time, thus reducing the accuracy since it is difficult to provide a stable power setting of the engine for a long time.

Also known in the art are remote methods for measuring the maximum pressure in the engine cylinders by pickups such as tensor, piezocrystal, electropneumatic, magnetic resilient sensors which operate in conjunction with the secondary meter.

The known methods allow to monitor the pressure in all the cylinders simultaneously for a comparatively short time, thus increasing the accuracy. In addition, the remote measurement methods allow to carry out multiple measurements of the pressure in all the cylinders for a relatively short time, acquiring a special importance when adjusting high forced induction quick engines.

However, most of the known maximum pressure pickups have a number disadvantages; a limited service life which does not permit to use them for monitoring the long duration operation of the engine; require coolant supply to them, thus making it difficult to mount them on the engine; additional valves required for cut off the gas from the engine cylinder to the pickup of the transmitter.

The most reliable is the device for measuring the maximum pressure in cylinders of the internal combustion engines which has no disadvantages of the known pickups and provides the remote maximum pressure measurements in the engine cylinders by using electropneumatic maximum register meter.

The known pickup for measuring the maximum pressure in the internal combustion engine cylinders comprises a housing provided with pipe connections for coupling the internal combustion engine cylinder and an air pressure supply passage respectively and a spring-loaded reversing valve installed therein whereas in one of the positions one of its operating surfaces contacts the seat in the housing on the side where the air pressure supply passage is made meanwhile another operating surface in another position of the valve contacts the other seat located on the side adjacent to the engine cylinder and a meter chamber confined with an operating surface of the reversing valve on the side of the engine cylinder and a respective seat whereas at the moment for measuring the pressure in the engine cylinder said meter chamber is in communication with this cylinder by opening with the supplied compressed air the valve having a rod provided with a spring pressing it to the reversing valve and a sealing ring designed for retaining the valve with the rod opened and for impeding the compressed air flowing into the engine cylinder wherein the pressure being measured at the moment of the reversing valve operation corresponds to the counter-pressure of the compressed air.

In said known pickup the valve having a rod is mounted in on portion of the housing which when mounting the pickup on the engine is coupled hermetically to another portion of the housing. When measuring the pressure the valve with a rod is opened under the effect of the counter-pressure to be compared by the piston mounted in an additional chamber.

However the additional chamber used with a piston complicates the design of the pickup. In this embodiment the housing comprises two units located perpendicular to each other and mounted in the critical access places on the engine successively whereas the union of the units is sealed by using a special sealing ring. In addition, the embodiment of the pickup comprising two units complicates the compressed air supply.

It is an object of the present invention to provide a compact pickup for measuring the pressure in the internal combustion engine cylinder.

It is another object of the present invention to provide a technology suitable for manufacturing the pickup.

It is still a further object of the present invention to provide a convenient operation of the pickup.

The object of the present invention is accomplished by providing a pickup for measuring the maximum pressure, comprising a housing having pipe connections for providing a communication with engine cylinder and compressed air supply passage respectively and a reversing valve installed therein which in one operating position contacts the seat made in the housing on the side of the compressed air supply passage meanwhile another operating surface in the second position of the valve contacts the other seat made on the side of the engine cylinder and a meter chamber confined with an operating surface of the reversing valve on the side of the engine cylinder and a respective seat whereas said meter chamber is in communication with the engine cylinder when measuring the pressure by opening with the supplied compressed air the valve with a rod provided with a spring pressing it to the reversing valve and a sealing ring intended for retaining the valve with a rod opened and impeding the compressed air flowing into the engine cylinder wherein the pressure to be measured at the moment of the reversing valve operation corresponds to the counter-pressure of the compressed air, according to the invention, whereas the end face of the valve rod is provided with a bead whose one surface facing the meter chamber is another seat of the reversing valve meanwhile another surface at the moment of the pressure measurement this bead rests on the housing whereas the valve rod is provided with a passage to communicate the meter chamber of the reversing valve with the engine cylinder when measuring the pressure meanwhile the sealing ring is located directly on said rod.

The design of the pickup, according to the invention, for measuring the maximum pressure provides a compact structure, convenient operation and technology suitable for manufacturing the pickup.

The present invention will be better understood from the following detailed description of a preferred embodiment thereof, with a due reference to the accompanying drawings wherein.

Figure 1:
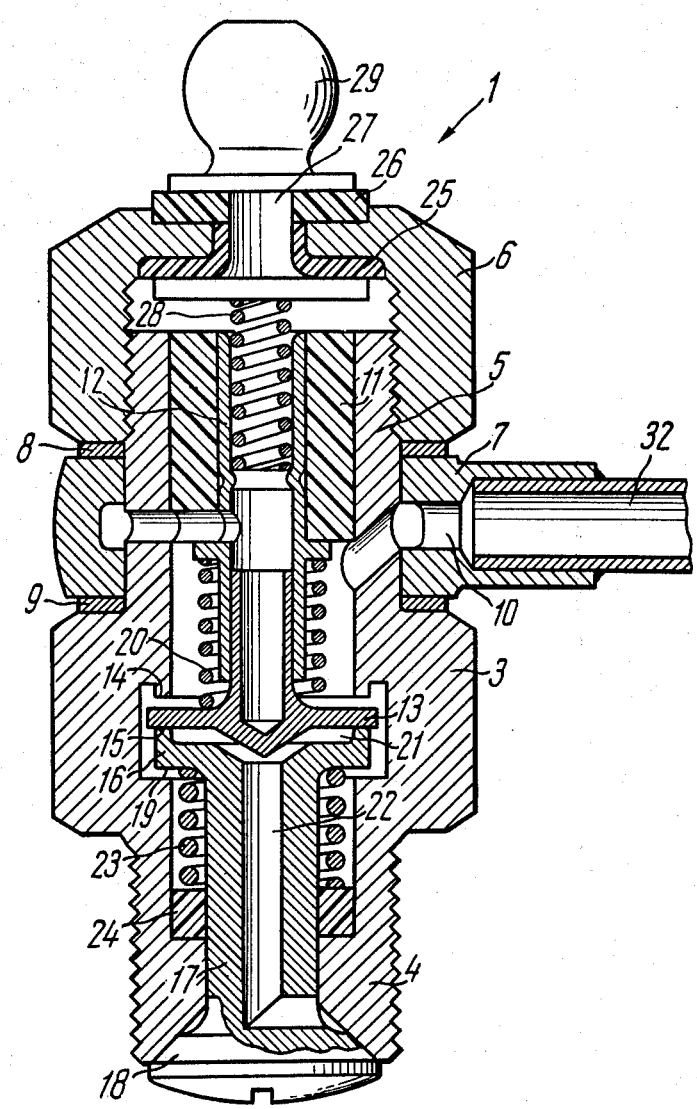
FIG. 1 shows a pickup for measuring the maximum pressure in the internal combustion engine cylinders, according to the invention (longitudinal section)
Figure 2:
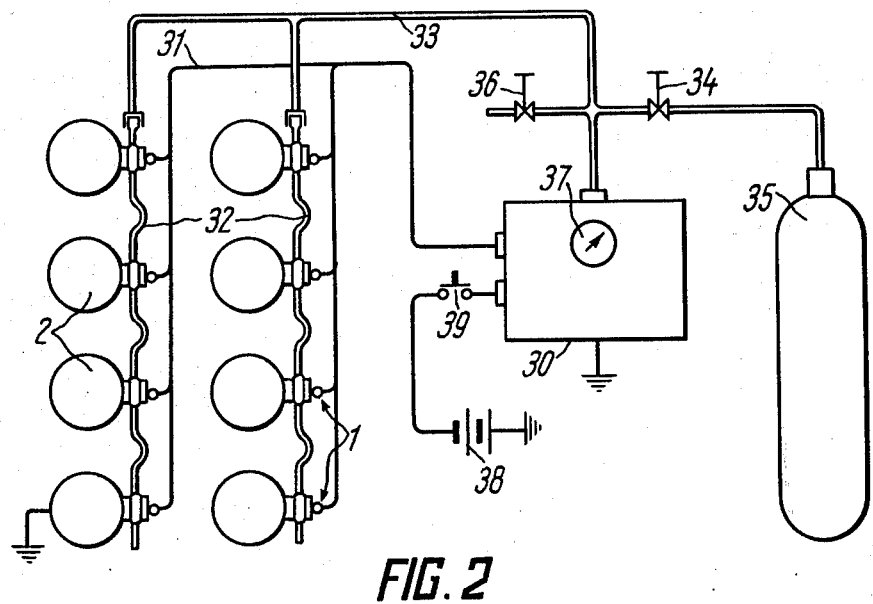
FIG. 2 shows a key diagram for measuring the maximum pressure in the internal combustion engine cylinders by using a pickup according to the invention.

According to the invention a pickup 1 (FIG. 1) for measuring the maximum pressure in cylinders 2 (FIG. 2) of the internal combustion engines (not shown) comprises a housing 3 (FIG. 1) provided with pipe connections 4 and 5. The pipe connection 4 of the pickup 1 is mounted in the cylinder 2 (FIG. 2) of the engine. By pipe connection 5 (FIG. 1), cap 6, nipple 7 and gaskets 8 and 9 the pickup 1 is in communication with a compressed air supply passage 10.

A reversing valve 13 is installed inside the housing 3 on a pin 12 isolated electrically by a sleeve 11.

One of the operating surfaces of the reversing valve 13 contacts a seat 14 made in the housing 3 on the side of the compressed air supply passage 10. Another operating surface of the reversing valve 13 in the second position contacts another seat 15 which is formed by an end face surface of a bead 16 made on the rod 17 of a valve 18 located in the pipe connection 4. Another end face surface 19 of the bead 16 when measuring the pressure rests on the housing 3.

A spring 20 installed on the pin 12 provides a constant electric contact of the pin 12 with the reversing valve 13, pressing it to the seat 15.

A meter chamber 21 confined with an operating surface of the reversing valve 13 and a respective seat 15 is in communication with the cylinder 2 (FIG. 2) of the engine when measuring the pressure at the opened valve 18 (FIG. 1) by a passage 22 made in the rod 17.

The valve 18 is provided with a spring 23 pressing it to the reversing valve 13. One end of the spring 23 rests on the bead 16 meanwhile another end thereof is on a sealing ring 24 intended for impeding the compressed air flowing from the passage 10 into the cylinder 2 (FIG. 2) of the engine as well as for retaining the valve 18 (FIG. 1) opened when measuring the pressure.

Installed in the cap 6 is an input 27 isolated electrically by sleeve 25 and washer 26 whereas said input 27 by a spring 28 is in a constant contact with the pin 12. Outside the input 27 is provided with a head 29 used for coupling the pickup 1 (FIG. 2) to a register 30, made according to a known circuit, by an electric cable 31.

Pickups 1 installed on the engine are combined into units by a common manifold 32 used to couple said pickups 1 to a pipe line 33.

The pipe line 33 is connected to the register 30, by a valve 34 said pipe line 33 is connected to a compressed air bottle 35 and by a valve 36, to the atmosphere.

Installed on the register 30 is a manometer 37 for monitoring the pressure in the pipe line 33. The register 33 is fed from a direct current supply 38 whose one terminal through a contact 39 is connected to this register 30 meanwhile another terminal is grounded.

The pickup for measuring the maximum pressure in the internal combustion engine cylinder, according to the invention, operates as follows:

When the compressed air pressure is not available in the pipe line 33 (FIG. 2) and therefore in the passage 10 (FIG. 1) the valve 18 is closed by a spring 23 and the pressure in the meter chamber 21 is absent. Therefore the reversing valve 13 is pressed by a spring 20 to the seat 15. The electric circuit of the pickup 1 comprising head 29, input 27, spring 28, pin 12, reversing valve 13, seat 15, rod 17 and housing 3 is closed.

When measuring the pressure in the cylinder 2 (FIG. 2) of the internal combustion engine the valve 36 is closed and the valve 34 is opened. The air pressure in the pipe line 33 is raised and checked by the manometer 37. When the pressure in the pipe line 33 is above the expected maximum level in the engine cylinder the valve 34 is closed meanwhile the valve 36 is opened partially. The registor 30 is connected by a contact 39 to a direct current supply 38. The air pressure in the pipe line 33 goes down smoothly.

When the air pressure is above the maximum pressure in the engine cylinder 2, the reversing valve 13 (FIG. 1) together with the valve 18 overcomes the force of the spring 23, thus moving under the effect of the compressed air to the engine cylinder 2 (FIG.2) and the bead 16 of the end face surface 19 reaches the housing 3. Hence the valve 18 opens an access of a quick variable pressure in the cylinder through the passage 22 to the meter chamber 21. Until the air pressure exceeds the pressure in the cylinder 2 (FIG. 2) the reversing valve 13 (FIG. 1) remains pressed to the seat 15 and the electric circuit of the pickup is closed. In further going down the air pressure is equal to the maximum pressure in the cylinder 2 (FIG. 2) at a certain moment and thereafter the maximum pressure in the cylinder 2 is above the air pressure. When increasing the pressure in the cylinder the reversing valve 13 (FIG. 1) is slewed from the seat 15 to the seat 14 and when the pressure in the cylinder drops the reversing valve 13 is slewed again from the seat 14 to the seat 15.

When slewing the reversing valve 13 from the seat 15 to the seat 14 and thereafter again from the seat 14 to the seat 15 the electric circuit of the pickup 1 is cut off for a short time and the registor 30 records a pressure value at which the pickup 1 advances the signals.

In the further air pressure reduction in the pipe line 33 (FIG.2) and therefore in the passage 10 (FIG. 1) of the pickup 1 the reversing valve 13, each time when the pressure in the cylinder goes up and down, is slewed from one seat to another, thus breaking the electric circuit meanwhile the registor 30 (FIG. 2) records the respective pressure.

The valve 18 (FIG. 1) is retained opened by a sealing ring 24 until the compressed air is fed to the pickup 1, i.e. until the counter-pressure exerts an effect. The pressure recorded by the registor 30 (FIG. 2) when the first signals are received from the pickup 1, is equal to the maximum pressure in the engine cylinder.

When the maximum pressure measurement is finished the valve 36 is opened completely and the compressed air from the pipe line 33 is withdrawn to the atmosphere. The contact 39 cuts off the registor 30 from the direct current supply 38.

When the air pressure in the passage 10 (FIG. 1) drops to a value proximate to the atmosphere pressure, the valve 18 is closed again by the spring 23, thus cutting off the access of the quick variable pressure in the cylinder 2 (FIG. 2) into the meter chamber 21 (FIG. 1) of the pickup 1 meanwhile the reversing valve 13 is pressed to the seat 15 by an effect of the spring 20.

An operation of one pickup 1 has been considered together with the registor 30. As a meter use is made of a multichannel registor. When measuring the pressure all the pickups mounted on the engine are connected to this registor which records the maximum pressure in all the cylinders of the engine simultaneously.

The pickup for measuring the maximum pressure together with manifolds for supplying the compressed air are installed permanently meanwhile the electric cable in conjunction with the registor is connected to the pickups permanently or provisionally in view of the operation conditions.

The pickup can be used when adjusting and monitoring the maximum pressure in the cylinder both in the internal combustion engines and also in piston compressors and other machines.

What is claimed is:

1. A pickup for measuring the maximum pressure in the internal combustion engine cylinder, comprising: a housing; a first pipe connection made on said housing for providing a communication with the internal combustion engine cylinder; a second pipe connection made on said housing for providing a communication with a compressed air supply passage; a reversing valve mounted in said housing and having two operating surfaces; a first seat made in said housing on the side of the compressed air supply passage and being in contact with one of the operating surfaces of said reversing valve in one of its operating positions; a valve with a rod mounted in said housing at the side of the engine cylinder; an end face of said rod provided with a bead used as the second seat of said reversing valve being in contact in another operating position with the other operating surface; a first spring pressing said reversing valve to the second seat; a sealing ring located directly on said valve rod and intended for retaining said valve opened and impeding the compressed air flowing from said compressed air supply passage into the engine cylinder; the second spring located on said valve rod and pressing it to said reversing valve; a meter chamber confined with said second seat and a respective operating surface of said reversing valve being in contact with said second seat; a passage made in said valve rod and communicating said meter chamber with the engine cylinder whose pressure at a moment of the reversing valve operation corresponds to the air counterpressure; electrical connections leading from said first spring to the exterior of said housing.

* * * * *